United States Patent
Oliver et al.

(10) Patent No.: US 9,027,128 B1
(45) Date of Patent: May 5, 2015

(54) AUTOMATIC IDENTIFICATION OF MALICIOUS BUDGET CODES AND COMPROMISED WEBSITES THAT ARE EMPLOYED IN PHISHING ATTACKS

(71) Applicant: Trend Micro Incorporated, Tokyo (JP)

(72) Inventors: Jonathan James Oliver, Kew (AU); Maria Estella Lim Manly, Pasig (PH); Maydalene Edsel Dela Cruz Salvador, Manila (PH); Ralph Hernandez, Quezon City (PH); Christopher Talampas, Quezon City (PH)

(73) Assignee: Trend Micro Incorporated, Tokyo (JP)

( * ) Notice: Subject to any disclaimer, the term of this patent is extended or adjusted under 35 U.S.C. 154(b) by 15 days.

(21) Appl. No.: 13/761,574

(22) Filed: Feb. 7, 2013

(51) Int. Cl.
*H04L 29/06* (2006.01)

(52) U.S. Cl.
CPC ........ *H04L 63/1408* (2013.01); *H04L 63/1425* (2013.01); *H04L 63/1483* (2013.01)

(58) Field of Classification Search
CPC ............ H04L 63/1483; H04L 63/1425; H04L 63/1408
USPC .......................................................... 726/22
See application file for complete search history.

(56) References Cited

U.S. PATENT DOCUMENTS

| | | | |
|---|---|---|---|
| 7,021,534 B1 | 4/2006 | Kiliccote | |
| 7,590,707 B2 * | 9/2009 | McCloy et al. | 709/217 |
| 7,802,298 B1 | 9/2010 | Hong et al. | |
| 7,854,001 B1 * | 12/2010 | Chen et al. | 726/22 |
| 7,984,500 B1 * | 7/2011 | Khanna et al. | 726/22 |
| 8,079,087 B1 * | 12/2011 | Spies et al. | 726/26 |
| 8,381,292 B1 * | 2/2013 | Warner et al. | 726/22 |
| 8,468,597 B1 * | 6/2013 | Warner et al. | 726/22 |
| 8,495,735 B1 * | 7/2013 | Warner et al. | 726/22 |
| 8,645,367 B1 * | 2/2014 | Hajaj et al. | 707/727 |
| 8,800,040 B1 * | 8/2014 | Tan et al. | 726/24 |
| 2004/0267610 A1 * | 12/2004 | Gossett et al. | 705/14 |
| 2005/0160330 A1 | 7/2005 | Embree et al. | |
| 2006/0041508 A1 * | 2/2006 | Pham et al. | 705/50 |
| 2006/0064374 A1 | 3/2006 | Helsper et al. | |
| 2006/0070126 A1 | 3/2006 | Grynberg et al. | |
| 2006/0080735 A1 * | 4/2006 | Brinson et al. | 726/22 |
| 2006/0101120 A1 | 5/2006 | Helsper et al. | |
| 2006/0123464 A1 * | 6/2006 | Goodman et al. | 726/2 |
| 2006/0123478 A1 * | 6/2006 | Rehfuss et al. | 726/22 |
| 2006/0168066 A1 | 7/2006 | Helsper et al. | |
| 2007/0112814 A1 | 5/2007 | Chesshire | |
| 2007/0118904 A1 * | 5/2007 | Goodman et al. | 726/22 |
| 2007/0245310 A1 * | 10/2007 | Rosenstein et al. | 717/116 |
| 2007/0282739 A1 | 12/2007 | Thomsen | |
| 2008/0028444 A1 | 1/2008 | Loesch et al. | |
| 2008/0034073 A1 * | 2/2008 | McCloy et al. | 709/223 |
| 2008/0082662 A1 | 4/2008 | Dandliker et al. | |
| 2008/0133540 A1 * | 6/2008 | Hubbard et al. | 707/10 |
| 2009/0070872 A1 * | 3/2009 | Cowings et al. | 726/23 |

(Continued)

*Primary Examiner* — Darren B Schwartz
*Assistant Examiner* — J. Brant Murphy
(74) *Attorney, Agent, or Firm* — Okamoto & Benedicto LLP

(57) ABSTRACT

Uniform resource locators (URLs) that include strings matching known malicious budget codes are deemed to be malicious URLs. Compromised websites and compromised IP addresses are identified from the malicious URLs. URLs obtained from network traffic to compromised domain names or compromised IP addresses are inspected to identify candidate budget codes. Candidate budget codes that are confirmed to be malicious budget codes are included in a watch list, which may be distributed to endpoint computers to detect phishing attacks.

13 Claims, 5 Drawing Sheets

(56) References Cited

U.S. PATENT DOCUMENTS

| | | | |
|---|---|---|---|
| 2009/0164485 A1* | 6/2009 | Burke et al. | 707/100 |
| 2010/0095375 A1* | 4/2010 | Krishnamurthy et al. | 726/22 |
| 2010/0095378 A1* | 4/2010 | Oliver et al. | 726/22 |
| 2011/0087648 A1* | 4/2011 | Wang et al. | 707/709 |
| 2011/0099633 A1* | 4/2011 | Aziz | 726/24 |
| 2011/0167474 A1* | 7/2011 | Sinha et al. | 726/1 |
| 2012/0054192 A1* | 3/2012 | Song et al. | 707/741 |
| 2012/0222111 A1* | 8/2012 | Oliver et al. | 726/22 |
| 2012/0227104 A1* | 9/2012 | Sinha et al. | 726/22 |
| 2012/0324568 A1* | 12/2012 | Wyatt et al. | 726/13 |
| 2014/0298460 A1* | 10/2014 | Xue et al. | 726/23 |

* cited by examiner

403 — hxxp://ciopea.com/9NMZoGBH/index.html
404 — hxxp://ciopea.com/a5oewJdx/index.html
405 — hxxp://ciopea.com/D3f9ZSdY/index.html
406 — hxxp://ciopea.com/DEuPYuqs/index.html
407 — hxxp://ciopea.com/H4Tc9Qt9/index.html

FIG. 6 hxxp://ciopea.com/H4Tc9Qt9/index.html
hxxp://iolopenso.altervista.org/H4Tc9Qt9/index.html
hxxp://lojadesapatos.com.br/H4Tc9Qt9/index.html
hxxp://mollywyldfyre.com/H4Tc9Qt9/index.html
hxxp://mvdenglish.com/H4Tc9Qt9/index.html

FIG. 7 hxxp://ashqmusic.com/DEuPYuqs/index.html
hxxp://ciopea.com/DEuPYuqs/index.html
hxxp://ftp.amexseleccion.com/DEuPYuqs/index.html
hxxp://ftp.gymtixx.com/DEuPYuqs/index.html
hxxp://hifius.com/DEuPYuqs/index.html
hxxp://iolopenso.altervista.org/DEuPYuqs/index.html
hxxp://mollywyldfyre.com/DEuPYuqs/index.html
hxxp://sitildc.altervista.org/DEuPYuqs/index.html
hxxp://www.co.custer.id.us/DEuPYuqs/index.html

FIG. 8

AUTOMATIC IDENTIFICATION OF MALICIOUS BUDGET CODES AND COMPROMISED WEBSITES THAT ARE EMPLOYED IN PHISHING ATTACKS

BACKGROUND OF THE INVENTION

1. Field of the Invention

The present invention relates generally to computer security, and more particularly but not exclusively to methods and apparatus for detecting phishing attacks.

2. Description of the Background Art

Phishing involves stealing information, such as usernames, passwords, and credit card information, by mimicking a legitimate organization in Internet communications. Phishing may be perpetrated using a webpage, or other user interface, that purports to belong to a legitimate organization to trick the victim into entering his confidential information into the webpage. Phishing may also be perpetrated by sending emails that include a link to a webpage of a malicious website or other harmful content. Victims are fooled into clicking the link because the emails are designed to look like they are from a legitimate organization trusted by the victim.

Phishing attacks may be blocked by Internet Protocol (IP) reputation. For example, the DNS-based blacklist (DNSBL) may be consulted to identify IP addresses of servers that are sending spam emails. Although IP reputation may be employed to block some phishing attacks, a black hole list is very difficult to maintain because of the sheer number of malicious servers on the Internet. Some of these servers may also be compromised servers, i.e., legitimate servers that have been infected, so blocking them will also result in blocking legitimate emails.

Email authentication is also ineffective in blocking phishing attacks because of the setup involved and because some users are reluctant to block emails that fail an authentication check.

Examining emails to identify content indicative of spam (e.g., keywords) is problematic because a phishing email looks like a legitimate email and has very similar content. The same is true with identifying spam emails by content hashes.

Link, Uniform Resource Locator (URL), and web domain reputations are very useful in blocking phishing attacks. For example, the Anti-Phishing Working Group (APWG) collects URLs of phishing webpages and provides the collected URLs as a service to legitimate organizations and security companies. Unfortunately, collecting URLs of phishing webpages is a laborious task because of the large and increasing number of phishing webpages. Often, by the time a webpage has been verified to be a phishing webpage and its URL has been published, the phishing attack is already over and new phishing attack has begun with a new webpage and a new URL.

Another problem with lists of phishing URLs is that cybercriminals have adopted the strategy of using hundreds (if not thousands) of webpages of compromised legitimate websites. This makes detection difficult because the domains cannot simply be blocked (they are legitimate domains), requiring each individual webpage added to the legitimate website to be verified.

SUMMARY

In one embodiment, uniform resource locators (URLs) that include strings matching known malicious budget codes are deemed to be malicious URLs. Compromised websites and compromised IP addresses are identified from the malicious URLs. URLs obtained from network traffic to compromised domain names or compromised IP addresses are inspected to identify candidate budget codes. Candidate budget codes that are confirmed to be malicious budget codes are included in a watch list, which may be distributed to endpoint computers to detect phishing attacks.

These and other features of the present invention will be readily apparent to persons of ordinary skill in the art upon reading the entirety of this disclosure, which includes the accompanying drawings and claims.

DESCRIPTION OF THE DRAWINGS

FIGS. 4-8 illustrate an example operation of a support computer system performing the process of FIG. 3 in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
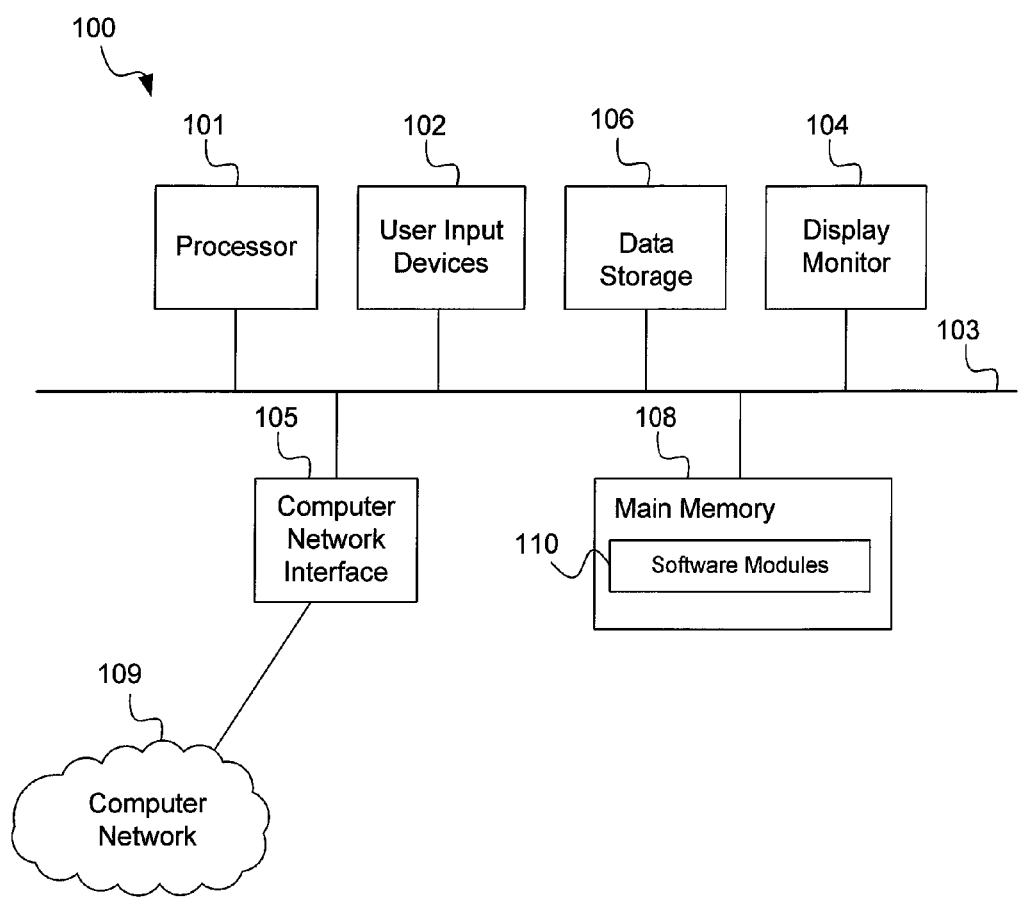
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as any of the computing devices described below. The computer 100 may have fewer or more components to meet the needs of a particular application. The computer 100 may include a processor 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor, cathode ray tube), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise a URL analyzer for automatically generating a watch list when the computer 100 is employed as part of a support computer system. As another example, the software modules 110 may comprise a security module and a watch list when the computer 100 is employed as an endpoint computer for detecting phishing attacks.

The computer 100 may be configured to perform its functions by executing the software modules 110. The software modules 110 may be loaded from the data storage device 106 to the main memory 108. An article of manufacture may be embodied as computer-readable storage medium including instructions that when executed by a computer causes the computer to be operable to perform the functions of the software modules 110.

Figure 2:
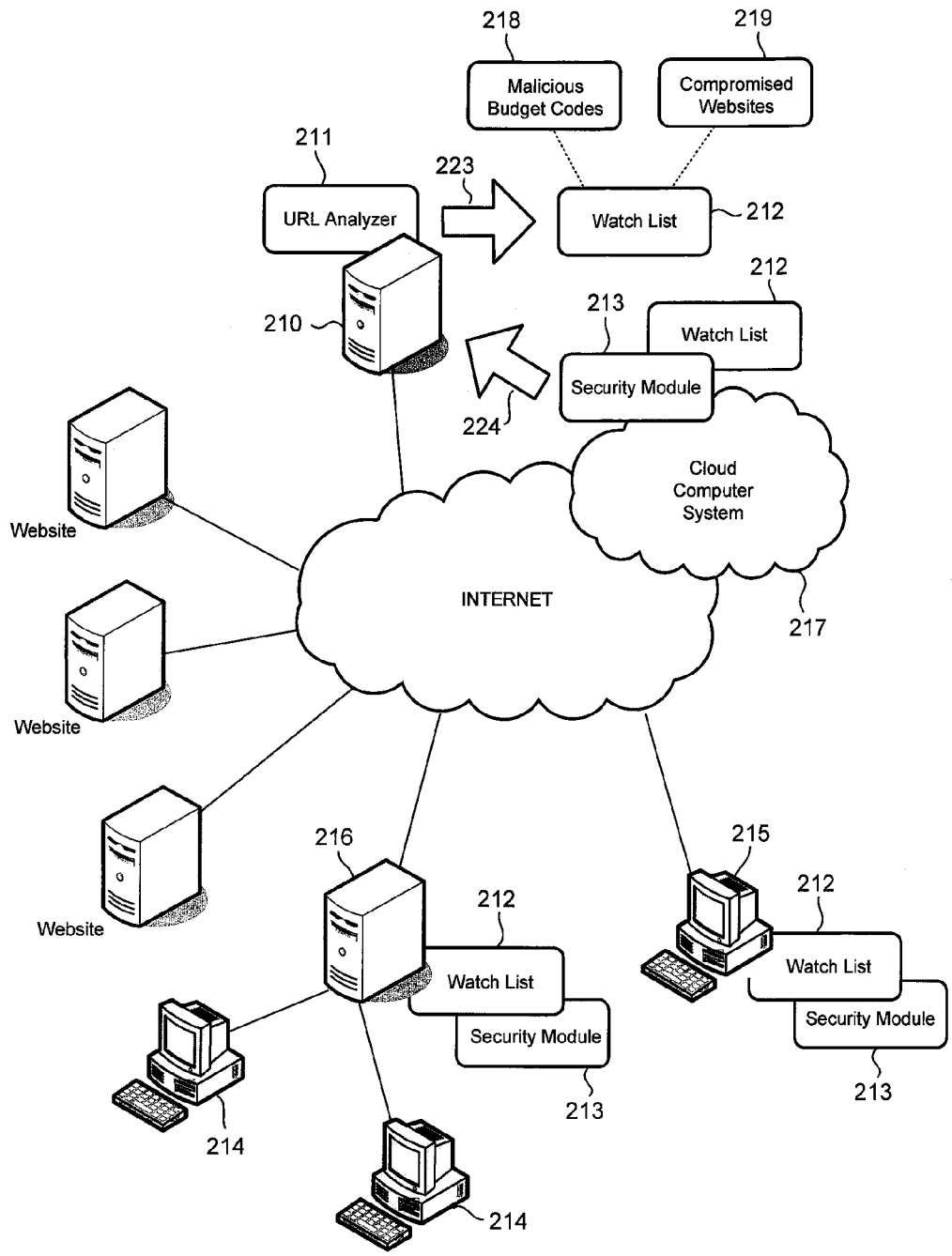
FIG. 2 shows a system for detecting phishing attacks in accordance with an embodiment of the present invention.

FIG. 2 shows a system for detecting phishing attacks in accordance with an embodiment of the present invention. In the example of FIG. 2, the system includes a support computer system 210 that generates and distributes a watch list 212, and one or more endpoint computers that detect phishing attacks using the watch list 212. In the example of FIG. 2, the endpoint computers comprise a gateway computer system 216, a user computer 215, and a cloud computer system 217. The gateway computer system 216 and user computers 214 may belong to the same private computer network. The gateway computer system 216 provides a centralized node for detecting phishing attacks to protect the user computers 214. FIG. 2 also shows a plurality of websites hosted by web server computers on the Internet.

The support computer system 210 may comprise one or more computers operable to generate a watch list 212 for detecting phishing attacks. In one embodiment, the support computer system 210 is operated by an antivirus research center, such as the TrendLabs antivirus research and support center of Trend Micro, Inc. The support computer system 210 runs a URL analyzer 211 to generate a watch list 212 (see arrow 223). In the example of FIG. 2, a watch list 212 comprises a list of malicious budget codes 218 and a list of compromised websites 219.

In one embodiment, the URL analyzer 211 comprises computer-readable program code that receives a URL feed, finds URLs with known malicious budget codes from the URL feed to identify malicious URLs, identifies compromised domains and IP addresses from the malicious URLs to identify compromised websites, identifies candidate budget codes from network traffic to compromised websites, and determines whether or not candidate budget codes are malicious budget codes. The compromised websites identified by the URL analyzer 211 may be packaged and distributed as a watch list of compromised websites 219, and the malicious budget codes identified by the URL analyzer 211 may be packaged and distributed as a watch list of malicious budget codes 218.

The inventors realized that a malicious webpage that performs the malicious action (e.g., stealing information, downloading malicious code) and a link that lures the victim to the malicious webpage are not necessarily from the same entity. For example, the malicious webpage may be served by a website hosted by a fraudster and the phishing email or other user interface that includes a malicious URL linking to the malicious webpage may be sent by a spammer; the fraudster and the spammer are typically not the same person. It is very useful to the fraudster to be able to track which spam message has resulted in a victim arriving at the compromised website. This might be useful for identifying which spam is most effective, or for payment. The inventors found that fraudsters identify spammers by assigning a budget code for a particular spammer. The budget code may be numeric, alphanumeric, or some other string containing symbols. The budget code may be one contiguous string, or may be split into components or encoded in other ways in the URL.

The inventors also found that fraudsters typically use the budget code as a directory name in a directory structure of a compromised website, which is a legitimate website that has been hijacked by the fraudster. Because of the difficulty involved in hijacking a website, fraudsters tend to reuse the same compromised website for phishing activities. One approach used by fraudsters is it to simply create a new directory in the compromised website and store the malicious webpage or other harmful content in the new directory. Embodiments of the invention allow for detection and blocking of phishing attacks by identifying compromised websites and budget codes. Advantageously, as will be more apparent below, the identification of compromised websites and budget codes are performed automatically from a URL feed to compensate for the increasing number and complexity of phishing attacks. The compromised websites may be indicated in the watch list 219 of compromised websites, and the budget codes may be indicated in the watch list 218 of malicious budget codes. The watch lists 218 and 219 may be packaged together as a watch list 212, which may be distributed to endpoint computers where phishing detection is performed. The watch list 212 may be periodically updated by the support computer system 210 and distributed to the endpoint computers to reflect newly identified malicious budget codes and compromised websites.

In the example of FIG. 2, a security module 213 comprises computer-readable program code for detecting phishing attacks. In one embodiment, the security module 213 parses an email, webpage, or other user interface for a URL. The security module consults the watch list 212 to determine if a URL includes a budget code that matches a malicious budget code indicated in the watch list 218 and/or if the URL includes a domain name or IP address that matches a domain name or IP address of a compromised website indicated in the watch list 219. If so, the security module 213 deems the URL to be a malicious URL that links to a phishing webpage or other malicious content. The security module 213 may block a detected phishing attack by dropping or putting in quarantine the user interface employed to perform the phishing. For example, the security module 213 may prevent the user from accessing a detected phishing email. The security module 213 may forward the URL of the phishing email or other suspect URLs to the support computer system 210 for analysis, for example.

The security module 213 and the watch list 212 may be deployed in a central computer, such as the gateway computer system 216. In that implementation, the gateway computer system 216 runs the security module 212 to screen URLs in network traffic to and from the user computers 214. The security module 213 and the watch list 212 may also be deployed in the user computer 215, which may be a home computer that has no gateway or other computer that performs phishing detection. In that implementation, the user computer 215 itself detects phishing attacks. The security module 213 in the end user computer 215 and the gateway computer system 216 may provide detected malicious or suspect URLs to the support computer system 210.

The security module 213 may also be deployed in a cloud computer system 217, which comprises one or more computers accessible over the Internet. The cloud computer system 217 may receive URLs from subscribing computers, and inform the subscribing computers whether or not a URL is malicious. For example, a subscribing computer may forward a URL to the cloud computer system 217 for evaluation. In the cloud computer system 217, the security module 213 consults the watch list 212 to determine if the URL includes a malicious budget code or a domain name or IP address of a compromised website. The cloud computer system 217 provides the result of the evaluation to the subscribing computer, which can perform a response action as appropriate. The cloud computer system 217 may forward detected malicious URLs to the support computer system 210 for further analysis or as part of a URL feed (see arrow 224).

Figure 3:
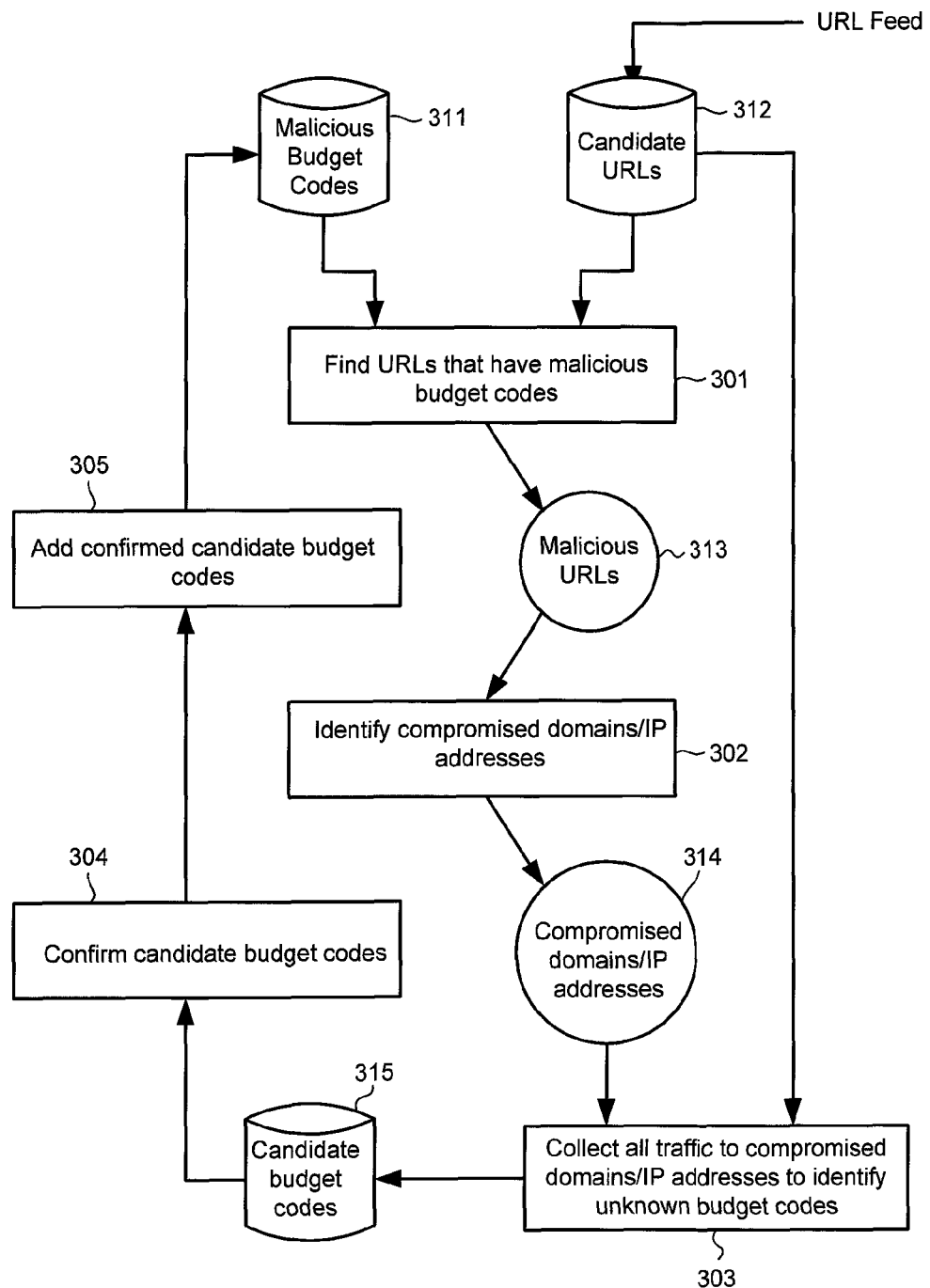
FIG. 3 shows a flow diagram of a process of automatically identifying malicious budget codes and compromised websites in accordance with an embodiment of the present invention.

FIG. 3 shows a flow diagram of a process of automatically identifying malicious budget codes and compromised websites in accordance with an embodiment of the present invention. The process of FIG. 3 is explained as being performed by the URL analyzer 211 to automatically generate a watch list 212 for illustration purposes only. The process of FIG. 3 may also be performed by other components without detracting from the merits of the present invention.

The process of FIG. 3 receives a datastore 311 of malicious budget codes and a datastore 312 of candidate URLs as process inputs. As its name implies, a candidate URL may or may not be a malicious URL. The candidate URLs may come from a URL feed, such as URLs submitted by the gateway computer system 216, user computer 215, the cloud computer system 217, or other computers. The candidate URLs may be from detected spam emails or browsing history of subscribing computers, for example. The candidate URLs may also be from network traffic logs collected by a content delivery network, such as the AKAMAI TECHNOLOGIES network.

When a victim clicks on a malicious URL, the web browser of the victim's computer connects to retrieve the phishing webpage referenced by the malicious URL. A malicious URL has a domain name or IP address of the compromised website hosting the phishing webpage. The malicious URL also includes a malicious budget code to identify the spam email (or other user interface that includes the malicious URL) that resulted in the victim navigating to the compromised website. In the example of FIG. 3, the datastore 311 comprises budget codes that are known and confirmed to be malicious. In one embodiment, the malicious budget codes in the datastore 311 are automatically identified and confirmed by the process of FIG. 3. The datastore 311 may also be populated with malicious budget codes received from external feeds or submitted by antivirus researchers, especially in the beginning of the process when the datastore 311 has a limited number of malicious budget codes. As the process runs, the number of detected compromised websites increases, allowing for automatic identification of even more malicious budget codes.

In the example of FIG. 3, malicious budget codes from the datastore 311 and candidate URLs from the datastore 312 are provided as inputs to the process. The URL analyzer 211 parses each candidate URL to find a candidate URL that has a malicious budget code (process step 301). A candidate URL from the datastore 312 having a string that matches at least one malicious budget code from the datastore 311 is deemed to be a malicious URL and is automatically included in a listing of malicious URLs (process output 313).

To identify a compromised domain name or compromised IP address, the URL analyzer 211 parses a malicious URL to extract a domain name or IP address from the malicious URL (process step 302). The domain names and IP addresses extracted from malicious URLs are deemed to be compromised domain names and IP addresses (process output 314). In one embodiment, for each compromised domain name/IP address retrieved from a malicious URL, the URL analyzer 211 identifies where the matching malicious budget code fits or is located in the malicious URL. This advantageously provides a pattern where unknown budget codes may be found in other URLs. Optionally, the URL analyzer 211 may also identify the timestamp of the first recorded access to the malicious URL as a "start time" and the timestamp of the last recorded access to the malicious URL as an "end time." The identified compromised domains and IP addresses may be packaged and distributed as a watch list 219 of compromised websites. A security module 213 may deem network traffic going to a domain name or IP address indicated in the watch list 219 to be going to a compromised website.

To identify unknown budget codes, which in this example are budget codes not included in the datastore 311, the URL analyzer 211 collects all network traffic to compromised domains/IP addresses (process step 303). In one embodiment, the URL analyzer 211 goes through the datastore 312 of candidate URLs and other sources of URLs (e.g., web traffic logs) to identify network traffic to compromised domain names/IP addresses and extract candidate budget codes from URLs of the network traffic (process output 315). The URL analyzer 211 records each candidate budget code with the corresponding compromised domain name/IP address of the URL where the candidate budget code is found.

A candidate budget code is a "candidate" in that it has not been confirmed to be a budget code. That is, a candidate budget code may not be identifying a spammer, and thus is not reused in other phishing attacks. Using a regular expression, candidate budget codes may be found in the same or general location of matching malicious budget codes found in malicious URLs.

The URL analyzer 211 determines whether or not a candidate budget code is a malicious budget code (process step 304). In one embodiment, the URL analyzer goes through the list of candidate budget codes (from process output 315) to identify candidate budget codes that appear more than a threshold number of times (e.g., 2, 3, or higher) in network traffic to different compromised domain names/IP addresses. In an example where the threshold is set to three, a candidate budget code that is present in more than three malicious URLs with distinct compromised domain names/IP addresses is confirmed to be a malicious budget code. A candidate budget code that has been confirmed is added by the URL analyzer 211 into the datastore 311 as a malicious budget code (process step 315). The malicious budget codes from the data store 311 may be packaged and distributed to endpoint computers as a watch list 218 of malicious budget codes.

Figure 4:
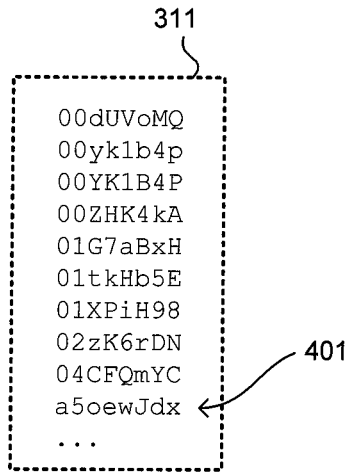

FIGS. 4-8 illustrate an example operation of the support computer system 210 performing the process of FIG. 3 in accordance with an embodiment of the present invention. In the example of FIG. 4, the datastore 311 of malicious budget codes includes a malicious budget code "a5oewJdx" (see arrow 401) and other malicious budget codes (e.g., "00dUVoMQ", "00yk1b4p", "00YK1B4P" etc.).

Figure 5:
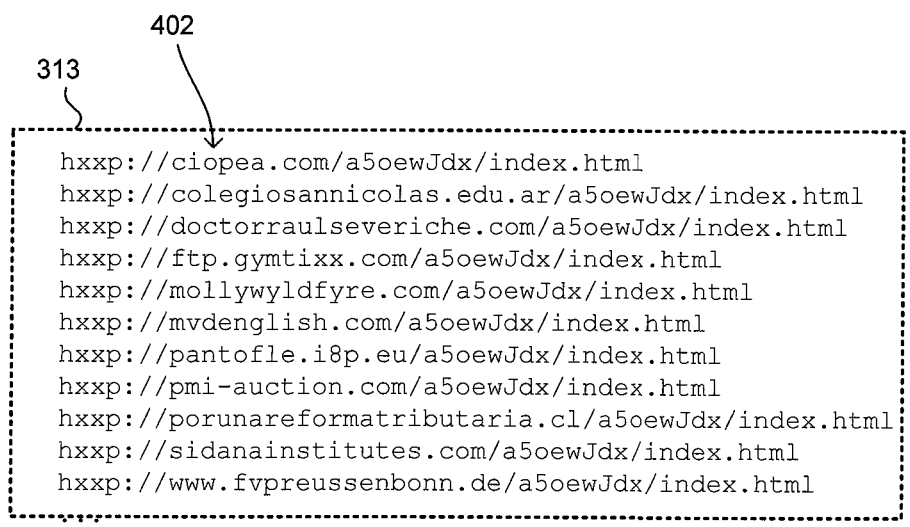

FIG. 5 shows URLs from the datastore 312 of candidate URLs that include a string matching the malicious budget code "a5oewJdx", and are thus deemed to be malicious URLs and included in the process output 313. Other malicious URLs matching other malicious budget codes are not shown for clarity of illustration. In the example of FIG. 5, the URL analyzer 211 finds the malicious budget code "a5oewJdx" as an 8-character string delimited by slashes and located just before "index.html" in each of the malicious URLs containing the malicious budget code. That is, the malicious budget code "a5oewJdx" is the name of a particular directory in the compromised website, which the inventors found is usually the case.

In the example of FIG. 5, the malicious URL "hxxp://ciopea.com/a5oewJdx/index.html" has the domain name "ciopea.com" (see arrow 402). Other malicious URLs that have the malicious budget code "a5oewJdx" include "hxxp://colegiosannicolas.edu.ar/a5oewJdx/index.html", "hxxp://doctorraulseveriche.com/a5oewJdx/index.html", "hxxp://ftp.gymtixx.com/a5oewJdx/index.html", etc. In the example of FIG. 5, the domain names "ciopea.com", "colegiosannicolas.edu.ar", "doctorraulseveriche.com", "gymtixx.com", etc. are deemed to be compromised domain names and included in the listing of domain names/IP address of the process output 314 (shown in FIG. 3). These compromised domain names may be included in the watch list 219 of compromised websites.

In the example of FIG. 6, other URLs linking to the compromised domain name "ciopea.com" (see FIG. 5, arrow 402) are collected and parsed by the URL analyzer 211 to identify unknown budget codes. In the example of FIG. 6, URLs 403, 406, and 407 include unknown budget codes "9NMZoGBH", "DEuPYuqs", and "H4Tc9Qt9", respectively. These unknown budget codes are not included in the datastore 311 of malicious budget codes, and are thus deemed to be candidate budget codes and included in the process output 315 (shown in FIG. 3) of candidate budget codes.

FIG. 7 shows other URLs with different compromised domain names and including the candidate budget code "H4Tc9Qt9". The candidate budget code "H4Tc9Qt9" is in more than three (the threshold in this example) distinct URLs with different compromised domain names, and is thus confirmed to be a malicious budget code. Similarly, FIG. 8 shows other URLs with different compromised domain names confirming that the candidate budget code "DEuPYuqs" is a malicious budget code. The candidate budget code "9NMZoGBH" is also confirmed in similar fashion. The confirmed candidate budget codes "9NMZoGBH", "DEuPYuqs", and "H4Tc9Qt9" are accordingly added by the URL analyser 211 to the datastore 311 as malicious budget codes. As before, the malicious budget codes may be included in the watch list 218 of malicious budget codes.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented process comprising:
receiving a plurality of candidate uniform resource locators (URLs) in a computer;
identifying malicious URLs in the computer by finding candidate URLs in the plurality of candidate URLs having a string that matches a malicious budget code in a listing of malicious budget codes, wherein malicious budget codes in the listing of malicious budget codes identify one or more spammers;
parsing the identified malicious URLs to identify compromised domain names;
collecting network traffic going to the identified compromised domain names;
extracting candidate budget codes from the collected network traffic;
deeming a candidate budget code among the candidate budget codes to be another malicious budget code that is not yet included in the listing of malicious budget codes when the candidate budget code appears in two or more distinct URLs with different domain names in the collected network traffic, wherein the candidate budget code is a substring of the two or more distinct URLs with different domain names; and
adding the candidate budget code as another malicious budget code to the listing of malicious budget codes.

2. The process of claim 1 further comprising:
including the identified compromised domain names in a watch list; and
distributing the watch list to endpoint computers that detect phishing attacks by comparing domain names from incoming URLs to compromised domain names indicated in the watch list.

3. The process of claim 2 wherein the endpoint computers include a gateway computer system.

4. The process of claim 1 further comprising:
including the malicious budget codes in the listing of malicious budget codes in a watch list; and
distributing the watch list to endpoint computers that detect phishing attacks by comparing strings of incoming URLs to malicious budget codes indicated in the watch list.

5. The process of claim 1 further comprising:
parsing the identified malicious URLs to identify compromised IP addresses; and wherein the collected network traffic includes network traffic going to the identified compromised IP addresses.

6. The process of claim 1 wherein the plurality of candidate URLs is received from a URL feed.

7. A system comprising:
a support computer system that finds uniform resource locators (URLs) with malicious budget codes to identify malicious URLs, identifies compromised domains or compromised internet protocol (IP) addresses from the malicious URLs to identify compromised websites, identifies candidate budget codes in network traffic to the identified compromised websites, and deems a candidate budget code to be a malicious budget code when the candidate budget code appears in two or more distinct URLs with different domain names in the network traffic to the identified compromised websites, wherein the malicious budget code identifies a spammer and is a substring of the two or more distinct URLs with different domain names; and
an endpoint computer that receives a watch list comprising the identified compromised websites, and detects phishing attacks by checking incoming URLs for domain names or IP addresses indicated in the watch list.

8. The system of claim 7 wherein the endpoint computer comprises a gateway computer system.

9. The system of claim 7 wherein the endpoint computer comprises a user computer.

10. The system of claim 7 wherein the watch list includes budget codes identified and confirmed by the support computer system to be malicious budget codes and the endpoint computer detects phishing attacks by checking the incoming URLs for presence of malicious budget codes indicated in the watch list.

11. The system of claim 7 wherein the incoming URLs are from spam emails received in the endpoint computer.

12. A computer-implemented process comprising:
receiving a plurality of candidate uniform resource locators (URLs) in a computer;
identifying in the computer a malicious uniform resource locator (URL) by checking the plurality of candidate URLs for presence of a first malicious budget code, the malicious budget code identifying a particular entity participating in a phishing attack;
parsing the malicious URL to identify a compromised domain name;
collecting network traffic going to the compromised domain name;
extracting a candidate budget code from the collected network traffic; and
confirming that the candidate budget code is a second malicious budget code that is different from the first malicious budget code when the candidate budget code appears in two or more distinct URLs with different domain names, wherein the candidate budget code is a substring of the two or more distinct URLs with different domain names.

13. The process of claim 12 further comprising:

adding the second malicious budget code in a watch list; and distributing the watch list to an endpoint computer that detects phishing attacks.

* * * * *